US008615501B2

United States Patent
Lorenz et al.

(10) Patent No.: US 8,615,501 B2
(45) Date of Patent: Dec. 24, 2013

(54) HYPERVISOR SERVICE TO PROVIDE IMAGE VERSION CONTROL SUPPORT

(75) Inventors: Dean Lorenz, Haifa (IL); Inbar Shapira, Givat Ada (IL); Gilad Sharaby, Mobile Post Hamovil (IL); Ezra Silvera, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1143 days.

(21) Appl. No.: 12/143,857

(22) Filed: Jun. 23, 2008

(65) Prior Publication Data

US 2009/0319580 A1    Dec. 24, 2009

(51) Int. Cl.
*G06F 17/00* (2006.01)
(52) U.S. Cl.
USPC ............................................. 707/694
(58) Field of Classification Search
USPC ............................................. 707/694
See application file for complete search history.

(56) References Cited

U.S. PATENT DOCUMENTS

| | | | | |
|---|---|---|---|---|
| 7,890,689 | B2* | 2/2011 | Lam et al. ................ | 711/6 |
| 8,392,915 | B2* | 3/2013 | Friedman et al. ......... | 718/1 |
| 2004/0044643 | A1* | 3/2004 | deVries et al. ........... | 707/1 |
| 2008/0034364 | A1 | 2/2008 | Lam et al. | |
| 2008/0134178 | A1* | 6/2008 | Fitzgerald et al. ........ | 718/1 |
| 2010/0114825 | A1* | 5/2010 | Siddegowda .............. | 707/638 |
| 2012/0284715 | A1* | 11/2012 | Fitzgerald et al. ........ | 718/1 |

OTHER PUBLICATIONS

Free Software Foundation, GNU GRUB Manual 0.97, 2006.*
Borja Sotomayor Basilio, "A Resource Management Model for VM-Based Virtual Workspaces", Chicago, Feb. 23, 2007 (Source: http://workspace.globus.org/papers/Workspace_Resource_Mgmt_Sotomayor_Masters.pdf).

* cited by examiner

*Primary Examiner* — Syed Hasan
*Assistant Examiner* — Kurt Mueller
(74) *Attorney, Agent, or Firm* — Daniel Kligler

(57) ABSTRACT

A revision control service is included in a hypervisor. The revision control service manages revision control operations relating virtual machine images transparently to the virtual machine. The revision control service interacts with a conventional revision control program, stores relevant revision control metadata external to the virtual machine image with file-level granularity, and synchronizes virtual machine operations with the revision control operations. From the perspective of the virtual machine, the revision control service provides a clean image from which to boot, without modification of the revision control program.

17 Claims, 6 Drawing Sheets

HYPERVISOR SERVICE TO PROVIDE IMAGE VERSION CONTROL SUPPORT

BACKGROUND OF THE INVENTION

1. Field of the Invention

This invention relates to virtualized computer environments. More particularly, this invention relates to a hypervisor service that supports image version control.

2. Description of the Related Art

The meanings of certain acronyms and abbreviations used herein are given in Table 1.

TABLE 1

Acronyms and Abbreviations

| VM | Virtual Machine |
|---|---|
| RC | Revision Control |

In computer environments, virtualization is the creation of substitutes for real resources, that is, substitutes that have the same functions and external interfaces as their counterparts, but differ in attributes, such as size, performance, and cost. These substitutes are called virtual resources, and their users or operating systems are typically unaware of the substitution. Virtualization is commonly applied to physical hardware resources by combining multiple physical resources into shared pools from which users receive virtual resources. With virtualization, one physical resource can appear as multiple virtual resources. Moreover, virtual resources can have functions or features that are not available in their underlying physical resources. Essentially, each operating system behaves as if it has the resources of an entire machine under its exclusive control, when in fact a virtualization layer transparently ensures that resources are properly shared between different operating system images and their applications.

System virtualization can be approached by actually partitioning hardware, For example, a physical server can be partitioned, each partition being controlled by a respective operating system. Alternatively, virtualization may be achieved using a virtual machine manager, known as a hypervisor. A hypervisor is typically implemented by a layer of code in software or firmware that operates in a privileged environment on the physical host and interacts with underlying hardware to share its resources dynamically among several operating systems. Resource sharing using a hypervisor may have a relatively fine degree of granularity as compared with physical partitioning.

In virtualized environments virtual machine images or files containing such images may be deployed to multiple virtual machines. Such image files contain a collection of programs and data to be executed and used by the virtual machine, and are typically bootable. An image of a virtual machine can be "certified" as meeting predefined specifications, and distributed to many other virtual machines, either as clones or after customization. As deployments of such images have increased, image-based virtual machine lifecycle management has become increasingly common. Lifecycle management deals with the administration of virtual machine images, for example, the deployment of virtual machines, and assuring compliance among the images.

BRIEF SUMMARY

An embodiment of the invention provides a method of version control on a virtualization platform, which is carried out by executing a virtual machine manager in a computer, executing a plurality of virtual machines that are monitored by the virtual machine manager, and executing a revision control client so as to track versions of virtual machine images of a file system at a file-level granularity. The method is further carried out by executing a revision control service that is incorporated in the virtual machine manager so as to synchronize activities of the virtual machines with revision control operations of the revision control client transparently to the revision control client and the virtual machines, and responsively to the revision control operations, generating an updated virtual machine image.

Other embodiments of the invention provide computer software product and apparatus for carrying out the above-described method.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Figure 1:
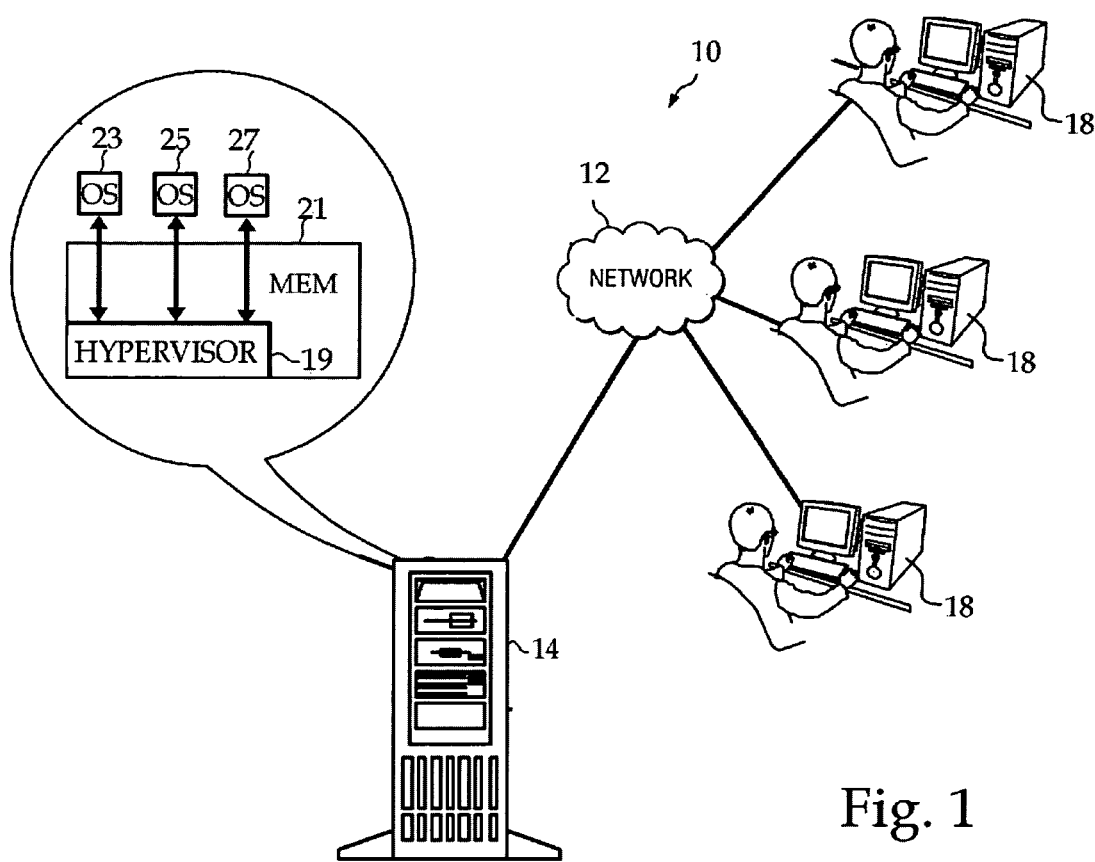
FIG. 1 pictorially illustrates a networked data processing system in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

Overview.

Typical virtual machine lifecycle management tasks include tracking who "checked out" an image from a repository and its destination, and importantly, maintaining a record of changes or updates made to the image. One method of preventing loss of consistency when a file or image may be concurrently accessed by multiple users is to lock the file so that only one developer at a time has write access to a master copy. This individual is said to have "checked out" the file. Others can read the file, but no one else is allowed to change that file until that developer submits ("checks in") an updated version or cancels the checkout. Currently, revision controls systems allow more than one individual to check out a file, providing facilities for merging updates upon check in. The basic functionality to support life-cycle management of virtual machine images can now be found in conventional revision control systems, which, inter alia, maintain images in a repository, manage multiple revisions of images, track originators of changes, track changes and conflicts, and handle merges of different versions.

In existing revision control management arrangements known to the inventors, the entire virtual machine is maintained as a single binary image comprising many files. A change within one of these files changes the entire image. This is not problematic from the standpoint of revision control in the case of changes to a single file, except for the computational expense required to process a large image. The revision is either accepted or rejected in its entirety. However, when change sets involving multiple files are managed by the revision control application, issues of merging and conflict resolution appear. The user must be allowed to choose which files in the change set to accept, which to reject, and which to merge into a particular branch. Furthermore, it is desirable that fragments of a file having conflicts be treated individually.

In one aspect of coordination with virtual machine operations and revision control systems, it is necessary to manage file attributes, e.g., permissions and ownership. These attributes must be accounted for in virtual machine operations. For example, it may be required that files be mapped to their actual owners, as opposed to a revision control client. In another example, it may be required that certain files not have a read-only attribute. Thus, in order to support revision control for a virtual machine image, provision should be made for appropriate handling of file attributes.

Revision control programs generally require metadata in order to function. Such metadata include, e.g., a list of checked-out, files, package names, repository location, locks, local history, and a history of previous versions. Some per-client metadata is typically stored in client file systems, intermixed with other image data. Often, a designated subdirectory is provided for the metadata. One difficulty with this arrangement is that the metadata may interfere with boot operations in a virtual machine when using checked-out image files. Those skilled in the art will be aware that individualized metadata in such image files would impair or even vitiate the production of certified images for distribution. Thus, it is desirable that metadata be kept separate from images and that revision control operations be transparent to normal operations of a virtual machine, i.e., the virtual machine does not recognize that revision control operations are occurring and, from its perspective, appears to continue its normal operations.

In accordance with disclosed embodiments of the invention a revision control service is included in a virtual machine manager or hypervisor. The revision control service manages revision control operations relating to modification of a virtual machine image transparently to the virtual machine. The revision control service interacts with a conventional revision control client, stores relevant revision control metadata external to the virtual machine image with file-level granularity, and synchronizes virtual machine operations, e.g., start and stop, with revision control operations. From the perspective of the virtual machine, the revision control service provides a clean bootable image, without modification of the revision control client. The activities of the revision control service are transparent to the revision control client, in that the revision control client is unaware of the interventions of the revision control service and sees the bootable image as a file system directory tree that it would have produced had the revision control service not existed.

System Architecture.

Turning now to the drawings, reference is initially made to FIG. 1, which pictorially illustrates a networked data processing system 10 to which the principles of the invention are applied. The system 10 may involve a data network 12, which is a medium used to provide communications links between various devices and computers or other communications devices connected together within the system 10. The network 12 may include connections, such as wire, wireless communication links, or fiberoptic cables. The system 10 is not meant as an architectural limitation. Rather, the principles of the invention are applicable to many types of networks and configurations of computers and servers.

A host computer 14 serves any number of clients 18 shown representatively as being connected to the network 12. However, some or all of the clients 18 could be directly connected to the host computer 14. The clients 18 may be implemented by such devices as personal computers, network terminals, personal digital assistants (PDA's) or cellular telephones, and may use the same or different operating systems in many combinations. The clients 18 are provided with suitable memory for executing program instructions that support the functions and activities detailed below.

The host computer 14 employs a virtual platform that includes a virtual machine manger, implemented as hypervisor 19, which is typically realized as a software program that resides in a memory 21. The hypervisor 19 interacts with any number of guest operating systems 23, 25, 27. As noted above, the operating systems 23, 25, 27 may be the same or different, according to respective configurations of the clients 18. For example one or more of the clients 18 may be operating under a version of Unix®, while others of the clients 18 may be configured with a version of Microsoft Windows®. The general construction of virtual machines as implemented in the system 10 was introduced by the IBM Corporation several decades ago, and is now well known in the art.

Figure 2:
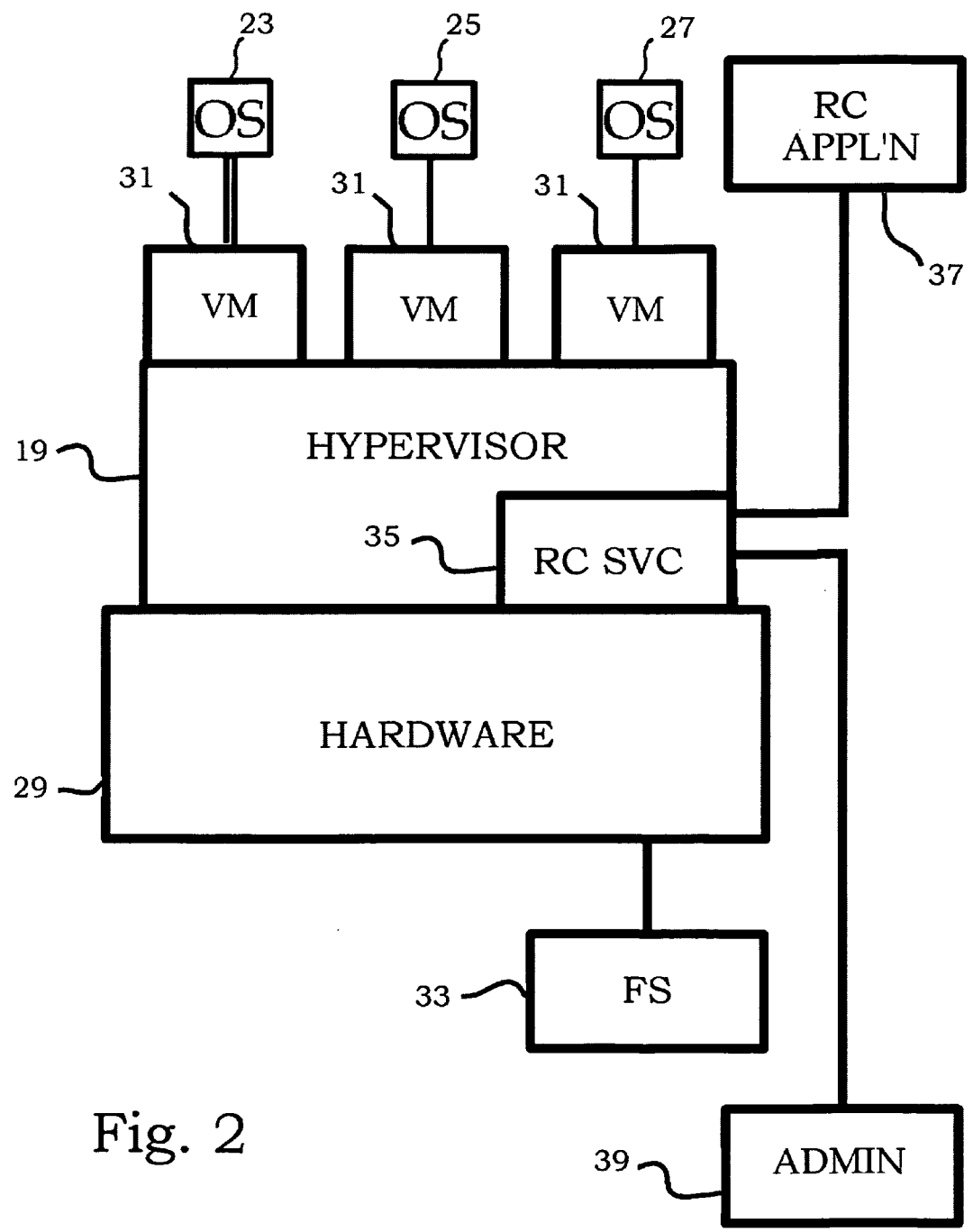
FIG. 2 is a more detailed block diagram of a virtualization platform for use by the host computer shown in FIG. 1, in accordance with a disclosed embodiment of the invention.

Reference is now made to FIG. 2, which is a more detailed block diagram of a virtualization platform for use by the host computer 14 (FIG. 1) in accordance with a disclosed embodiment of the invention. Operating systems 23, 25, 27 interact with underlying computer hardware 29 using respective virtual machines 31, which in turn are mediated by hypervisor 19. The hardware 29 is linked to a file system 33 on which is stored images desired to be booted by clients 18. These images are accessed by the hypervisor 19. Metadata for respective clients 18 is also found on the file system 33.

The hypervisor 19 incorporates a revision control service 35, which interacts with the virtual machines 31 and with a conventional revision control client 37 to support the life cycle of images generated by activities of the clients 18. Files of the virtual machines 31 are processed by the revision control service 35, transparently to the revision control client 37, such that the revision control client 37 performs its normal functions, processing virtual machine updates and releasing virtual machine image as new releases or branches, as appropriate. Configuration of the revision control service 35 is done by an administrator 39 who typically also controls other aspects of the hypervisor 19. The activities of the clients 18 are thus reflected in the images stored in the file system 33. The revision control client 37 offers version tracking at file-level granularity. The GIT open source version control system, available on the Internet, is suitable for use as the revision control client 37. Modifications of the GIT application to incorporate the principles of the invention will occur to those skilled in the art.

In the example of FIG. 2, the revision control service 35 is co-located with the hypervisor 19, and the revision control client 37 is shown as a single block. However either or both of these may be realized as distributed services, aspects of which may involve multiple servers. Whatever the actual physical arrangement, it is necessary that the hypervisor 19 exert coordination and control of the revision control service 35 and establish communication linkage with the revision control client 37.

Figure 3:
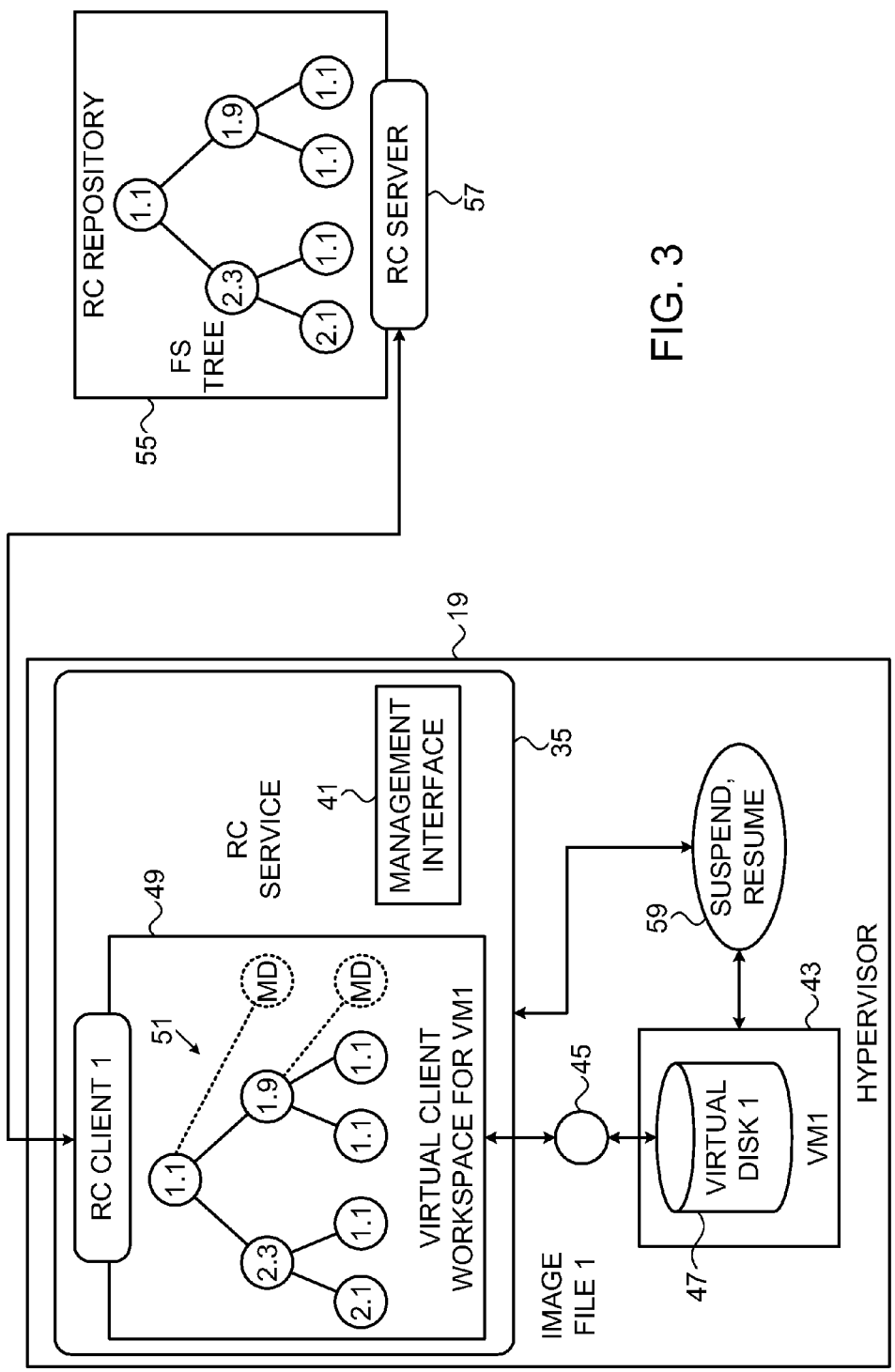
FIG. 3 is a detailed block diagram of the revision control service shown in FIG. 1, in accordance with a disclosed embodiment of the invention.

Reference is now made to FIG. 3, which is a detailed block diagram of the revision control service 35 (FIG. 1), in accordance with a disclosed embodiment of the invention. The revision control service 35 incorporates a management interface 41 for interaction with the administrator 39 (FIG. 1). Activities mediated through virtual machine 43 result in a virtual machine image file 45, which is presented to operating system 23 (FIG. 1) as a virtual disk 47. The revision control service 35 maintains a virtual client workspace 49, containing ordinary file system elements 51 and metadata 53. The workspace 49 is exposed to the revision control client 37 (FIG. 1) and stored in a revision control repository 55, for example on a separate revision control server 57. The revision control service 35 may mount the image file 45, using read-only mode as described above in order to allow the virtual machine 43 to continue working during revision control operations. Alternatively, the revision control service 35 may create a snapshot of the image file 45 in order to allow consistent revision control operations. The virtual machine 43, can be suspended and resumed by the revision control service 35, represented by control block 59, and is entirely unaware of the revision control operations. It will also be noted that the metadata 53 is not represented in the control repository 55 and is not visible to the virtual machine 43. Should the metadata 53 be required by the control repository 55, it can be obtained without affecting the operation of the virtual machine 43.

Operation.

Figure 4:
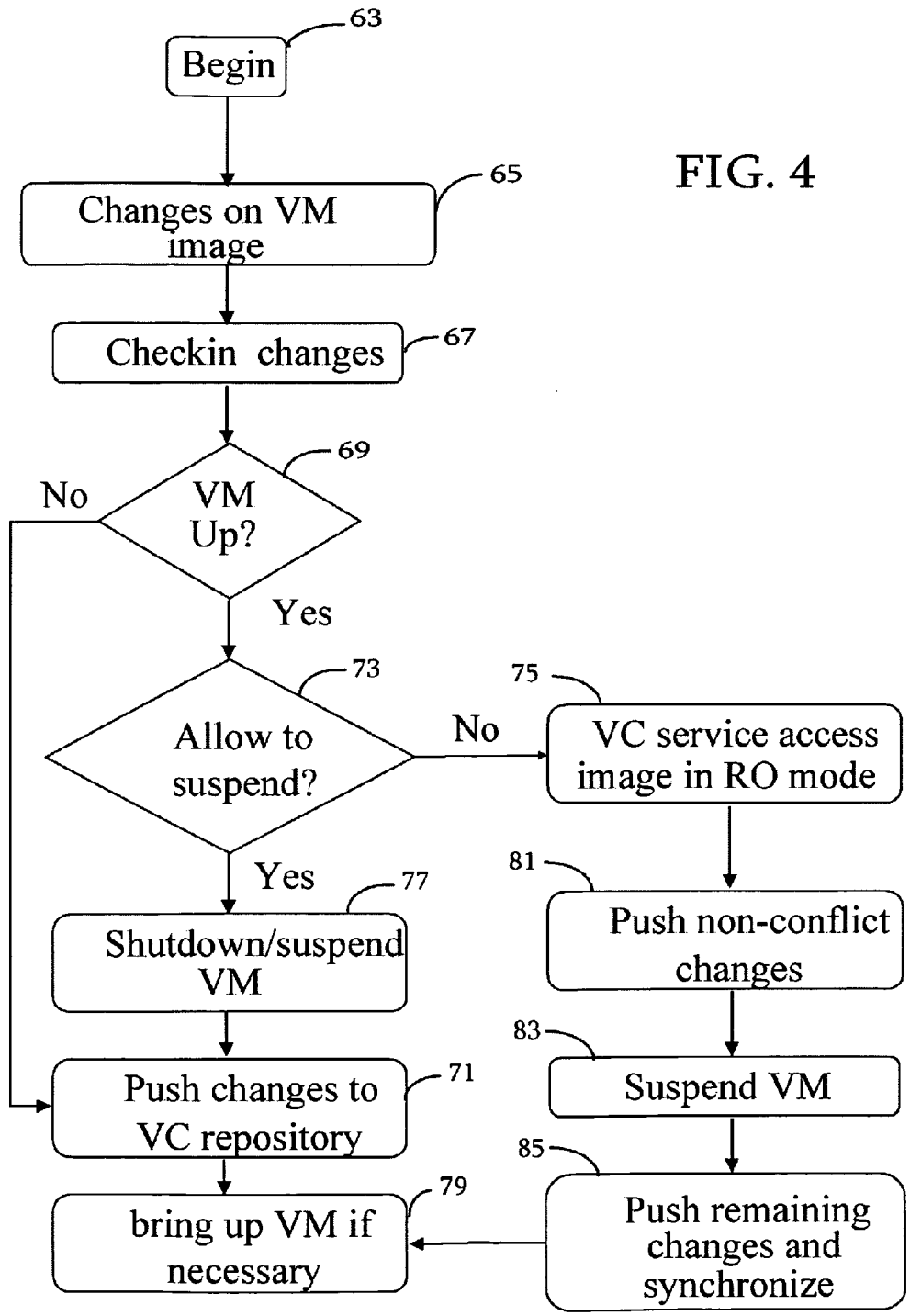
FIG. 4 is a flow chart illustrating operation of a hypervisor revision control service that provides image version control support in accordance with a disclosed embodiment of the invention.

Reference is now made to FIG. 4, which is a flow chart illustrating operation of a hypervisor revision control service that provides image version control support in accordance with a disclosed embodiment of the invention. At initial step 63, a system is configured as described above with reference to FIG. 1 and FIG. 2. A conventional revision control client offering file-level granularity is invoked. During initialization, the activity of a virtual machine provided by the hypervisor 19 (FIG. 2) is modified by the revision control service 35. This operation, as well as and other operations described below that are used to synchronize virtual machine management and revision control operations, are generally initiated by the revision control service 35. They are executed using privileged virtual machine operations. Such privileged operations include the utilization of platform-specific tools to access the virtual machine, e.g., loop mount, accessing a shared file system, suspending the virtual machine and taking a snapshot of the virtual machine during updates. The privileged instructions may allow the virtual machine to run during most of the operation, suspending and resuming the virtual machine during certain portions of a revision control operation.

Next, at step 65, changes are made to a virtual machine image. Then, at step 67, the changes made in step 65 are checked in.

Control now proceeds to decision step 69, where it is determined if the virtual machine is in operation. If the determination at decision step 69 is negative, then control proceeds to step 71, which is described below.

If the determination at decision step 69 is affirmative, then control proceeds to decision step 73, where it is determined if the virtual machine is to be suspended. If the determination at decision step 73 is affirmative, then control proceeds to step 77. Otherwise, control proceeds to step 75, which is described below.

At step 77 the virtual machine is suspended or otherwise shutdown.

Step 71 is performed following step 77, or if the determination at decision step 69 is negative. Changes to the virtual machine image are stored in the version control repository.

Next, at final step 79, the virtual machine is fully resumed, and the procedure ends.

Step 75 is performed if the determination at decision step 73 is negative. In the branch beginning with step 77 described above, the virtual machine is fully disabled during a revision control operation that involves mounting a new virtual machine image to replace a current virtual machine image. In an alternative sequence beginning with step 75, the revision control service 35 mounts a new virtual machine image without suspending operations on the current virtual machine image. However, while the new virtual machine image is being synchronized, the revision control service 35 only allows read-only access to the current virtual machine image. This option allows more efficient synchronization with the file system data repository.

At step 81 those changes in the virtual machine image that do not conflict with the new virtual machine image are sent to the version control repository, as in step 71.

Next, at step 83, the virtual machine is suspended. Then, at step 85 changes in the virtual machine image that were not stored in step 81 are sent to the version control repository. Control then proceeds to final step 79 and the procedure ends.

Alternate Embodiment

In this embodiment the system 10 is constructed as shown representatively in FIG. 1. However, the hypervisor 19 and the revision control service 35 (FIG. 1) now handle revision control operations for several virtual machines 31 simultaneously. This capability is available in the above-noted Git version control application. Various optimizations are applied by identifying and exploiting shared data and metadata. In one optimization, the revision control service may cause such data to be multicast by the revision control service 35 to all the virtual machines 31 on the hypervisor only once. Additional, various revision control resources may be shared among the relevant virtual machines.

Figure 5:
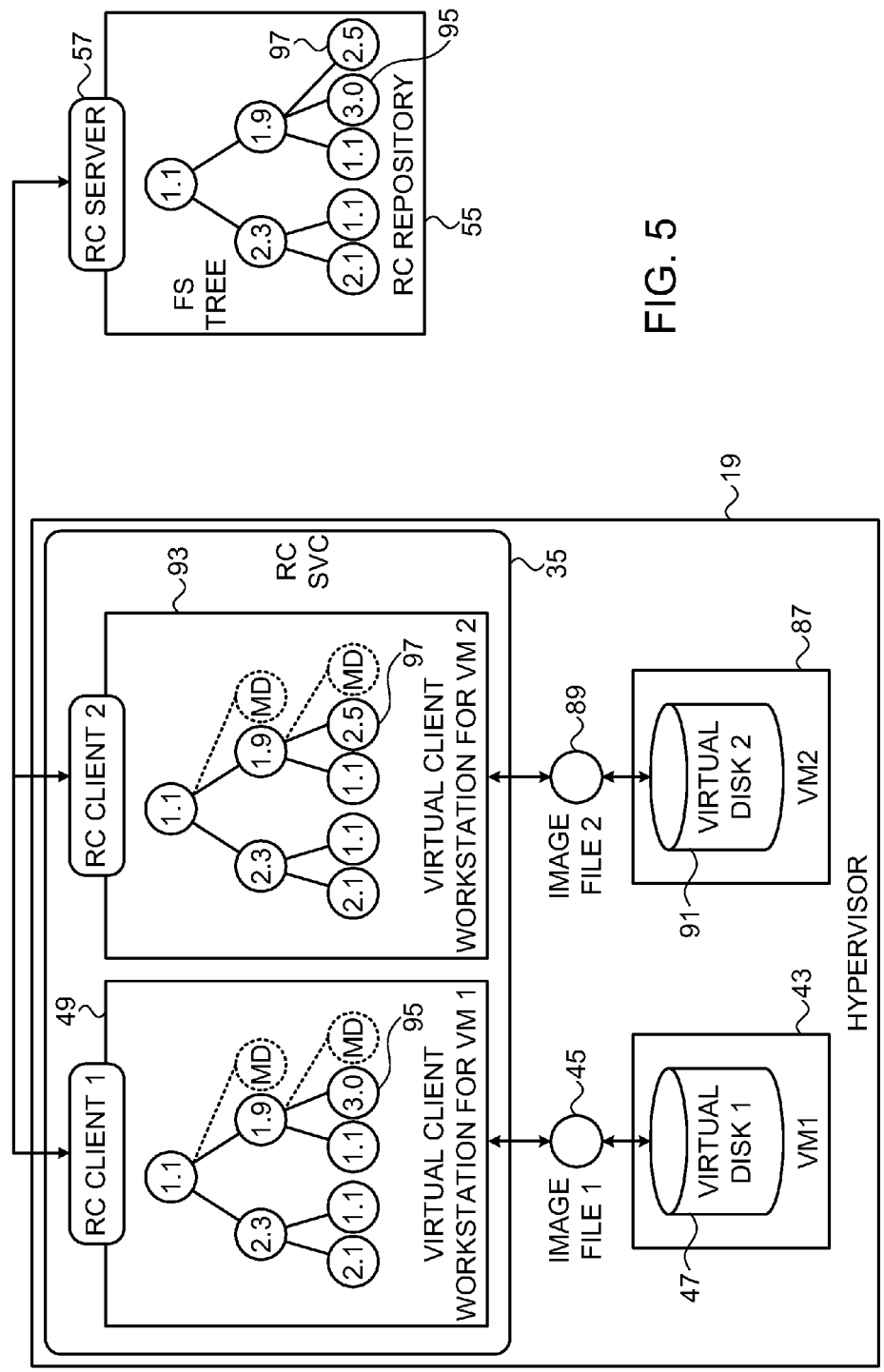
FIG. 5 is a detailed block diagram of the revision control service shown in FIG. 1 illustrates support of multiple virtual machines, in accordance with an alternate embodiment of the invention.

Reference is now made to FIG. 5, which is a detailed block diagram of the revision control service 35 (FIG. 1), in accordance with an alternate embodiment of the invention. The revision control service 35 is now configured to support multiple virtual machines, shown representatively as virtual machines 43, 87, having respective image files 45, 89, and virtual disks 47, 91. The revision control service 35 now maintains respective workspaces 49, 93 for the virtual machines 43, 87, which have different data modifications 95, 97. The control repository 55 holds all files for the virtual machines 43, 87, including the data modifications 95, 97. It should be noted that file attributes of common files may differ among the virtual machines 43, 87. Such differences must be maintained in the control repository 55.

Alternatively, the revision control service 35 can be configured such that the workspaces 49, 93 only contain common files common to both.

Another optimization involves resources having a copy-on-write property. As is known in the art, copy-on-write (CoW) resources, e.g., files, may be maintained by a user as a private copy of a shared resource. However, allocation of space on storage medium for such resources only occurs upon a user modification. Thus, if the same file occurs in the file systems of several virtual machines, rather than creating respective physical copies of that file for the virtual machines, a shared physical copy is created. Copy-on-write semantics are used to create respective logical copies. Read commands are simply forwarded to the shared physical copy. Write commands result in physical creation of new physical data, with appropriate redirections of subsequent accesses. The revision control service thus combines shared copy-on-write storage for different virtual machine file systems, updating such shared files only once for several virtual machines while maintaining consistency and efficient storage.

Figure 6:
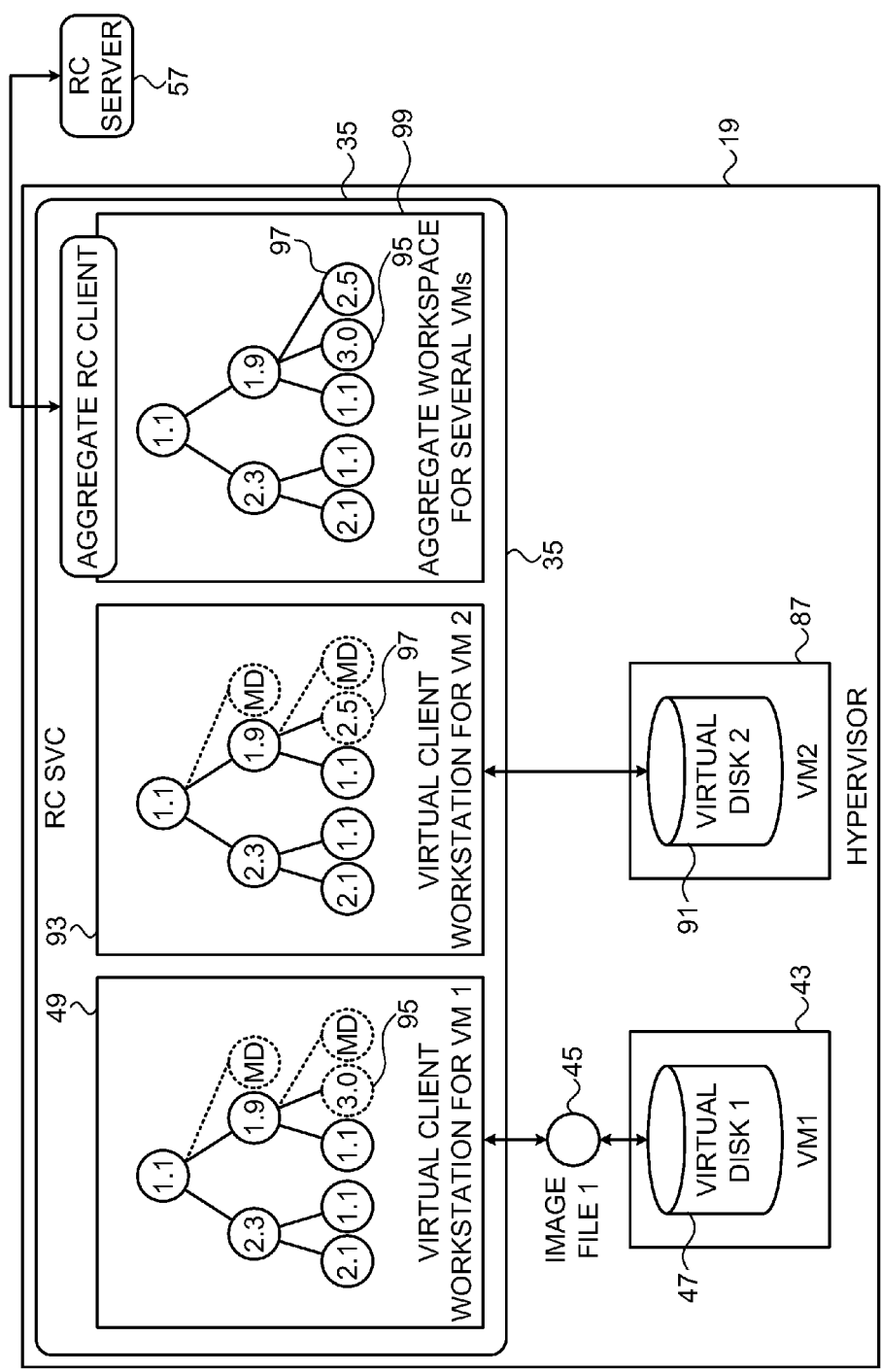
FIG. 6 is a detailed block diagram of the revision control service shown in FIG. 1, in accordance with an alternate embodiment of the invention that employs copy-on-write semantics.

Reference is now made to FIG. 6, which is a detailed block diagram of the revision control service 35 (FIG. 1), which employs copy-on-write semantics, in accordance with an alternate embodiment of the invention. In this arrangement, the revision control service 35 is configured to aggregate revision control operations for multiple virtual machines and to propagate common changes to individual client workspaces. The workspaces 49, 93 are combined into an aggregate workspace 99 by the hypervisor 19. The aggregate workspace 99 is also stored on the server 57.

The per-virtual machine workspaces may be implemented as logical copies of the aggregate workspace 99, exploiting the copy-on-write features of the arrangement. Thus, the workspace 93 of the virtual machine 87 is derived directly from the aggregate workspace 99. The virtual machine 87 does not employ a physical image file, as does the virtual machine 43. However, if required. The hypervisor 19 may construct an image file for the virtual machine 87 from a copy-on-write workspace such as the workspace 93. Alternatively, the hypervisor 19 may expose the workspace 93 as a virtual disk.

The revision control service 35 provides automatic respective checkpoints for the virtual machines during revisions' thereby enabling virtual machine rollbacks. A virtual machine may be checked-in from time-to-time in order to support system restore points. As this involves checking in all the files of the virtual machine, it is possible to reconstruct the virtual machine image from the checked-in version and to perform a rollback of the system if required.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of version control on a virtualization platform, comprising the steps of:
    executing a virtual machine manager in a computer, said computer having access to a file system;
    executing a plurality of virtual machines that are monitored by said virtual machine manager;
    executing a revision control client so as to track versions of a virtual machine image comprising files stored in said file system at a file-level granularity; and
    executing a revision control service in said virtual machine manager so as to synchronize activities of said virtual machines with revision control operations of said revision control client that are responsive to modifications in said files in a manner transparently to said revision control client and said virtual machines, wherein said revision control service is operative, responsively to the revision control operations, to suspend said activities of said virtual machines by shutting down said virtual machines during said revision control operations;
    while said virtual machines are inoperative performing the steps of
    revising said virtual machine image;
    replacing said virtual machine image of at least a portion of said virtual machines with said revised virtual machine image that includes said modifications in said files; and
    thereafter resuming said suspended activities by restarting said virtual machines.

2. The method according to claim 1, wherein said revision control service performs the steps of:
    for respective ones of said virtual machines identifying respective metadata of said files, maintaining said files within a respective instance of said virtual machine image in respective first locations in said file system, and maintaining said metadata outside said virtual machine image in respective second locations in said file system.

3. The method according to claim 2, wherein a portion of said files are shared files that are accessed by a set of said virtual machines, said shared files having a copy-on-write attribute, wherein said revision control service is operative to update said shared files no more than one time upon updates thereof by at least one of said virtual machines in said set.

4. The method according to claim 2, wherein said revision control service performs the steps of:
    determining respective file attributes of said files; and
    maintaining said file attributes in respective third locations in said file system.

5. The method according to claim 2, wherein said revision control service initiates operations of said virtual machines using said respective instance of said virtual machine image.

6. The method according to claim 1, wherein suspending said activities of said virtual machines comprises suspending write operations of said virtual machines on said files and permitting read-only access to said files.

7. The method according to claim 1, wherein said revision control service establishes respective checkpoints for said virtual machines.

8. A computer software product for version control, including a non-transitory computer storage medium in which computer program instructions are stored, which instructions, when executed by a computer, cause the computer to execute a virtual machine manager and a plurality of virtual machines that are monitored by said virtual machine manager, to access a file system under control of said virtual machine manager, execute a revision control program, said revision control program tracking versions of a virtual machine image at a file-level granularity, said virtual machine image comprising files stored in said file system, to instantiate a revision control service in said virtual machine manager, with said revision control service synchronize activities of said virtual machines transparently to said revision control program with revision control operations of said revision control program and said virtual machines, wherein said revision control service is operative, responsively to the revision control operations, to suspend said activities of said virtual machines by shutting down said virtual machines during said revision control operations, and while said virtual machines are inoperative to revise said virtual machine image, replace said virtual machine image of at least a portion of said virtual machines with said revised virtual machine image that includes modifications in said files, and upon completion of said revision control operations to resume said suspended activities by restarting said virtual machines.

9. The computer software product according to claim 8, wherein said revision control service is operative for respective ones of said virtual machines to identify respective metadata of said files, maintain said files as images in respective first locations in said file system, and maintain said metadata in respective second locations in said file system.

10. The computer software product according to claim 9, wherein said revision control service is operative to determine respective file attributes of said files, and maintain said file attributes in respective third locations in said file system.

11. The computer software product according to claim 9, wherein said instructions further cause said computer to initiate operations of said virtual machines using respective boot images.

12. The computer software product according to claim 9, wherein said revision control service is operative to suspend said activities of said virtual machines by suspending write operations of said virtual machines on said files and permitting read-only access to said files.

13. The computer software product according to claim 8, wherein said revision control service is operative to establish respective checkpoints for said virtual machines.

14. A data processing system providing image version control, comprising:
    a processor;
    a file system; and
    a memory accessible to said processor, wherein said processor is operative to execute a virtual machine manager and a plurality of virtual machines that are monitored by said virtual machine manager in said memory, to access said file system under control of said virtual machine manager, execute a revision control program, said revision control program tracking versions of a virtual machine image at a file-level granularity, said virtual machine image comprising files stored in said file system, said processor being operative to instantiate a revision control service in said virtual machine manager, and with said revision control service synchronize activities of said virtual machines transparently to said revision control program with revision control operations of said revision control program and said virtual machines, wherein said revision control service is operative, responsively to the revision control operations, to suspend said activities of said virtual machines by shutting down said virtual machines during said revision control operations, and while said virtual machines are inoperative to revise said virtual machine image, replace said virtual machine image of at least a portion of said virtual machines with said revised virtual machine image that includes modifications in said files, and upon completion of said revision control operations to resume said suspended activities by restarting said virtual machines.

15. The data processing system according to claim 14, wherein said revision control service is operative for respective ones of said virtual machines to identify respective metadata of said files, maintain said files as images in respective first locations in said file system, and maintain said metadata in respective second locations in said file system.

16. The data processing system according to claim 15, wherein said revision control service is operative to determine respective file attributes of said files, and maintain said file attributes in respective third locations in said file system.

17. The data processing system according to claim 14, wherein said revision control service is operative to suspend said activities of said virtual machines by suspending write operations of said virtual machines on said files and permitting read-only access to said files.

\* \* \* \* \*